Oct. 13, 1931.  C. A. BENNETT  1,827,183
PROCESS AND METHOD FOR GINNING COTTON WITH AIR BLAST GINS
Filed April 10, 1930
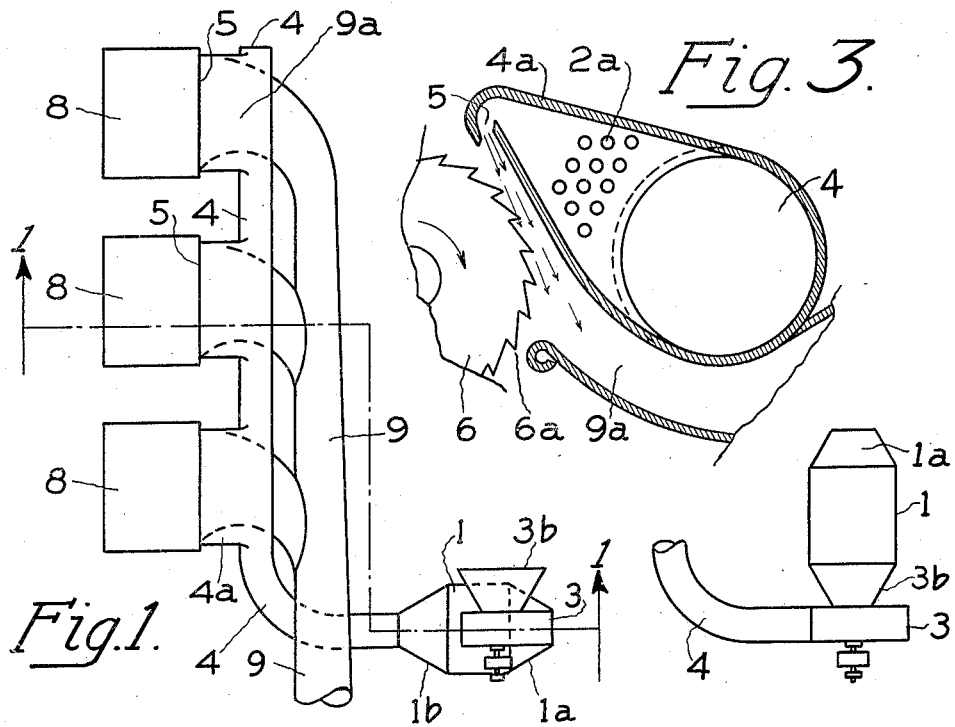
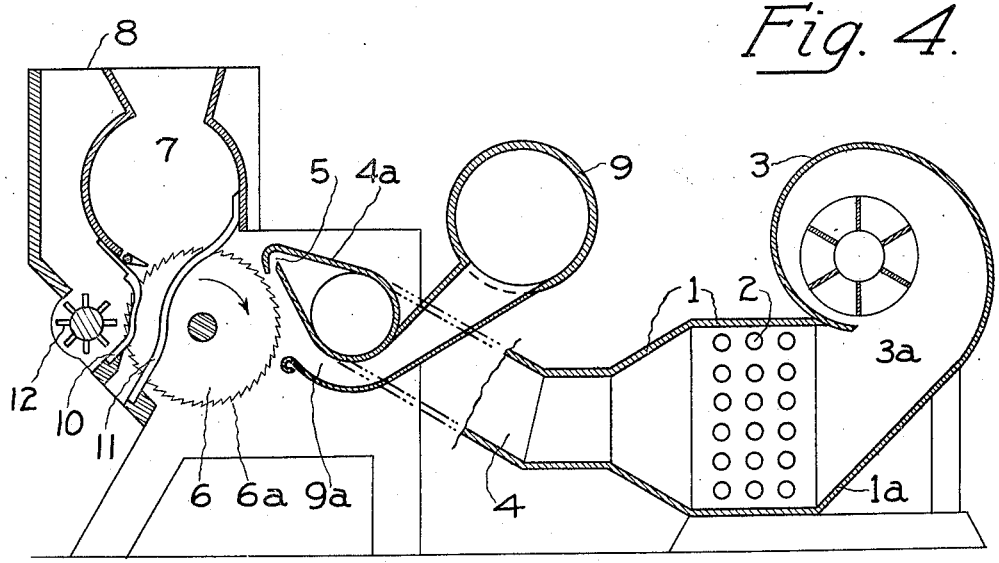
INVENTOR
Charles Abel Bennett

UNITED STATES PATENT OFFICE

CHARLES ABEL BENNETT, OF TALLULAH, LOUISIANA

PROCESS AND METHOD FOR GINNING COTTON WITH AIR-BLAST GINS

Application filed April 10, 1930. Serial No. 443,100.

(GRANTED UNDER THE ACT OF MARCH 3, 1883, AS AMENDED APRIL 30, 1928; 370 O. G. 757)

This application is made under the act of March 3, 1883, chapter 143 (22 Stat. 625) as amended, by the act of April 30, 1928 (45 Stat., 462), and the invention herein described may be manufactured and used by or for the Government, for governmental purposes, without payment to me of any royalty thereon.

My invention relates to improvements in the process of ginning cotton, for the ginning of damp cotton in particular, in which freshly ginned cotton fibres are separated from the saw teeth of the gin saws by means of a heated or dehydrated air-blast atmosphere conditioned to a suitable relative humidity upon delivery to the air-blast so as to not only enable the air-blast to remove excessive moisture from the freshly ginned fibres, but also to bring about a reduction in the adhesive or sticking characteristics frequently existing between the freshly ginned cotton fibres and the gin saw teeth upon which they ride or are conveyed.

Prior to my invention all air-blast types of gins have utilized an un-treated or un-conditioned air-blast atmosphere the relative humidity of which has varied directly with the external atmosphere. Consequently, prior to my invention, air-blast gins have been subjected to many difficulties when attempting to gin damp seed-cotton when the external atmosphere has been more or less saturated with water vapor, and when such ginning attempts have been accomplished they have usually resulted in damage to the sample and market value of the cotton fibres.

One of the principal difficulties in ginning damp seed-cotton with air-blast gins has been that encountered in the clinging or sticking of the damp fibres to the gin saw teeth as they emerge from the roll box of the gin. The air-blast jets of raw, un-treated atmosphere, especially in unfavorable weather, have not been successful in removing these clinging fibres from the swiftly moving gin saw teeth.

In my research investigations, I have discovered general facts upon which my invention of a process for improving the ginning of damp cotton in air-blast gins are based. These basic facts apply to all existing types of air-blast gins, and to all varieties or strains of cotton.

These facts are as follows:

First, that when the air-blast atmosphere of a gin has a low relative humidity (forty percent or less) it expedites the removal of damp cotton fibres from the gin saw teeth.

Second, that when the external atmosphere has a relative humidity of seventy (70%) percent with an accompanying temperature of 75 degrees Fahrenheit, the air-blast atmosphere used for ginning may be conditioned to a relative humidity of approximately forty (40%) percent or less by heating said air-blast atmosphere to a temperature above 100 degrees Fahrenheit.

Third, that when the external atmosphere has a relative humidity of seventy (70%) percent with an accompanying temperature of 75 degrees Fahrenheit, the air-blast atmosphere used for ginning may be conditioned to a relative humidity of approximately forty (40%) percent by substantially heatless dehydration with chemicals such as calcium chloride.

Fourth, that temperatures higher than 212 degrees Fahrenheit may endanger the physical qualities and properties of cotton fibres, such as clingability, tensile strength, color, etc. It is therefore desirable to limit the conditioning temperatures of the air-blast atmosphere to the range between 100 and 212 degrees Fahrenheit.

The objects, therefore, of my invention are:

First, to improve the ginning action of air-blast gins upon damp cotton by providing an efficient and dependable process of conditioning the air-blast atmosphere to a low relative humidity with or without increasing the temperature.

Second, to provide a simple, effective process which is applicable to existing air-blast gins.

Third, to provide an economical improvement capable of being operated when and as desired without requiring removal of apparatus contiguous to the conditioning equipment and without affecting the static pressure, velocity head and total pressure of the air-blast atmosphere delivered by a constant speed fan or blower.

Fourth, to provide a safe, effective and dependable process whereby damp seed-cotton may be profitably ginned during unfavorable weather.

I attain these objects by the process and method illustrated in the accompanying drawings, in which—

Figure 1 is a plan view of my conditioning apparatus incorporated into an air-blast ginning installation; and Figure 2 is a vertical section of an air-blast gin stand and air-blast ducts, illustrating one method of incorporating my conditioning apparatus therein, as it appears along the section line 1—1 in Figure 1; and Figure 3 is an enlarged section thru an air-blast gin stand, in the immediate region of the air-blast nozzle, illustrating an alternate location of my conditioning apparatus therein.

Figure 4 is a partial plan view, illustrating a modification of the general arangement shown in Fig. 1.

Similar numerals refer to similar parts throughout the several views.

Referring to the drawings it will be seen that my process comprises either:

First, a conditioning chamber 1 containing radiation elements 2; or

Second, radiation elements 2a installed within the air-blast branches 4a which connect the air-blast piping 4 to the air-blast nozzles 5 of the air-blast gin 8.

Where radiation elements 2 are housed in the conditioning chamber 1, or where radiation elements 2a are housed within the air-blast branches 4a of the gins 8, it is to be understood that suitable means (not shown) are provided for supplying a heating medium such as steam, hot water or electricity to said radiation elements 2, 2a.

The radiation elements 2 or 2a may consist either of suitable steam radiation surfaces, hot water radiation surfaces, encased electrical grid heating units or furnace radiation surfaces; the size and proportion and control thereof being based upon established engineering practices for producing and controlling the required temperatures in the air-blast volume of atmosphere. For existing gins powered by electricity, it is desirable, but not essential, that the radiation elements 2a be comprised of industrial electrical air-heating units, which may be immediately switched on or off to meet requirements.

Two possible locations of the conditioning chamber 1 will be noted in the drawings, the first position being shown in Fig. 1 and delineating the conditioning chamber 1 at the discharge 3a of the air-blast fan 3, the inlet 1a of the conditioning chamber 1 being an airtight continuation of the discharge 3a of said fan 3. The second position is delineated in Fig. 4 showing the conditioning chamber 1 placed at the suction 3b of the air-blast fan 3. The first position is known as a blow-thru arrangement, whereby the air-blast fan 3 discharges its air-blast atmosphere under pressure to the system thru the substantially airtight conditioning chamber 1. The second position is known as a draw-thru arrangement, whereby the air-blast fan 3 receives its conditioned atmosphere thru its suction intake 3b. Either position is satisfactory, but the blow-thru arrangement is preferable where the radiation surfaces 2 are made use of in a heat-conditioning process, because the air-blast fan 3 handles its atmosphere when at the greatest density (i. e., cool).

When chemicals are used to dehydrate the air as disclosed above, these chemicals being placed in the chamber 1 in lieu of the heating element, it is preferable for the draw-thru arrangement to be used, because the air-blast fan handles its atmosphere when at the greatest density.

The air-blast duct 4 conveys the conditioned air-blast atmosphere to the places of distribution or air-blast branches 4a, thence to the air-blast nozzles 5 where high velocity jets of atmosphere are continuously forced substantially tangentially to the periphery of the gin saws 6 whose teeth 6a move in the direction of revolution indicated by the arrow upon the saws 6. As the gin saw teeth 6a pass thru the roll box 7 which is filled with cotton (not shown) the ginning is performed.

The saw teeth 6a then convey the freshly ginned fibres to the region of the air-blast nozzles 5 whose jets of atmosphere (not shown) function as hereinbefore set forth. After being removed from the gin saw teeth 6a the freshly ginned cotton fibres (not shown) are conveyed by the expanded volume of air-blast atmosphere into the lint-flue take-offs 9a, thence thru the lint flue 9 to the subsequent condensing, tramping and baling equipment (not shown).

Referring to the operation of my process, it will be seen that every freshly ginned cotton fibre is subjected to the jet action of the air-blast nozzles 5, and that by supplying said air-blast nozzles 5 with an adequate volume of conditioned atmosphere of suitable relative humidity, the air-blast nozzle jets will function both as driers and removers of the freshly ginned cotton fibres. Existing air-blast cotton gins employ continuous nozzle jet velocities ranging from 10,000 to 20,000 feet per minute (by Government test), while the peripheral speed of existing high speed gin saws approximates a lineal velocity of 3,000 per minute (by Government test). The relative speed of the air-blast jets may therefore be said to be at least three times that of the gin saw teeth— which fact obviously affords an adequate opportunity for the conditioned atmosphere to not only decrease the moisture content of the exposed freshly ginned fibres, but also to reduce the stickiness and adhesiveness usually accompanying such fibre conditions.

It will readily be seen, by reference to Figure 2, why freshly ginned fibres may be damaged if not removed at once by the nozzle action of the air-blast gins, because any failure to remove the fibres permits them to be carried around the saws thru the ribs 10 and 11 after passing thru the seed-cotton in the vicinity of the picker roll 12. From these ribs 10 and 11 the fibres still clinging to the gin saw teeth 6 are then forced thru the seed-cotton within the roll box 7, thus producing many familiar phenomena such as twisting, roping, gin-cutting, dog-tailing, etc.

It will be further readily seen from Figures 2 and 3 that the free areas between the radiation elements 2, 2a are fixed. Therefore, the air-blast fan 3 operates under fixed conditions of static and dynamic pressure, substantially unaffected by any introduction of a heating medium into the radiation 2, 2a. Use of my process is, therefore, free from troublesome adjustments in fan speeds, dampers, or other devices.

It will be understood that changes or modifications in my method may be effected without departing from the spirit of my invention as hereinbefore described.

I claim:

1. An improvement in the process of doffing lint cotton from the saw teeth of air blast cotton gins comprised of decreasing the relative humidity of an air blast to not exceeding approximately 40% and propelling such conditioned air blast against gin saw teeth carrying lint cotton, immediately after said saw teeth and cotton have passed the gin ribs, such air blast being applied to said saw teeth at linear velocity exceeding that of the gin saw teeth.

2. An improvement in the process of doffing lint cotton from the saw teeth of air blast cotton gins comprised of propelling an air blast having a relative humidity of not exceeding approximately 40% against gin saw teeth carrying lint cotton immediately after said saw teeth and cotton have passed the gin ribs such air blast being applied to said saw teeth at a linear velocity exceeding that of the gin saw teeth.

3. An improvement in the process of doffing lint cotton from the saw teeth of air blast cotton gins comprised of maintaining a relative humidity of not exceeding approximately 40% in an air blast by heating said air blast to temperatures ranging from 100° F. to 212° F. and propelling such conditioned air blast against gin saw teeth carrying lint cotton immediately after said saw teeth and cotton have passed the gin ribs, such air blast being applied to said saw teeth at a linear velocity exceeding that of the gin saw teeth.

4. An improvement in the process of doffing lint cotton from the saw teeth of air blast cotton gins comprised of maintaining a relative humidity of not exceeding approximately 40% in an air blast by dehumidifying such air blast by passing it through some hygroscopic material and propelling such conditioned air blast against gin saw teeth carrying lint cotton immediately after said saw teeth and cotton have passed the gin ribs, such air blast being applied to said saw teeth at a linear velocity exceeding that of the gin saw teeth.

CHARLES ABEL BENNETT.